United States Patent
Miles et al.

[11] Patent Number: 6,010,135
[45] Date of Patent: *Jan. 4, 2000

[54] CHUCK

[75] Inventors: Kevin C. Miles; Benjamin A. Gaddis, both of Clemson, S.C.

[73] Assignee: Power Tool Holders, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/865,117

[22] Filed: May 29, 1997

[51] Int. Cl.$^7$ .................................................... B23B 31/12
[52] U.S. Cl. .............................. 279/62; 279/902; 384/615
[58] Field of Search ............................... 279/61, 62, 140, 279/902; 384/615

[56] References Cited

U.S. PATENT DOCUMENTS

| | | | |
|---|---|---|---|
| 1,123,541 | 1/1915 | Jacobs | 279/62 |
| 1,369,412 | 2/1921 | Englund | 279/62 |
| 2,382,975 | 8/1945 | Coddington | 384/615 |
| 4,382,639 | 5/1983 | McGuffie | 384/615 |
| 4,514,015 | 4/1985 | Sullivan | 384/615 |
| 4,944,642 | 7/1990 | Andersson | 384/615 |
| 5,348,317 | 9/1994 | Steadings et al. . | |
| 5,348,318 | 9/1994 | Steadings et al. . | |
| 5,501,473 | 3/1996 | Barton et al. . | |
| 5,553,873 | 9/1996 | Salpaka et al. . | |
| 5,669,616 | 9/1997 | Ho | 279/62 |

*Primary Examiner*—Steven C. Bishop
*Attorney, Agent, or Firm*—Dority & Manning, P.A.

[57] ABSTRACT

A chuck for use with a manual or powered driver having a rotatable drive shaft is provided. A generally cylindrical body member has a nose section and a tail section. A plurality of jaws are disposed within the body longitudinally with respect to a nose section axial bore. A self-contained anti-friction bearing assembly is in communication with the body. The bearing assembly has an inner race, an outer race and bearing elements cooperating together. A nut is integrally attached to the bearing assembly and in operative communication with the jaws. A generally cylindrical front sleeve member is in driving engagement with the nut and overlies the nose section of the body member whereby when the front sleeve member is rotated with respect to the body member, the jaws will be moved radially with respect to the axial bore of the nose section.

15 Claims, 4 Drawing Sheets

CHUCK

BACKGROUND OF THE INVENTION

The present invention relates generally to chucks for use with drills or with electric or pneumatic power drivers. More particularly, the present invention relates primarily to a chuck of the keyless type which may be tightened or loosened by hand or by actuation of the driver motor.

Both hand tool drivers and electric or pneumatic tool drivers are well known. Although twist drills are the most common tools used with such drivers, screw drivers, nut drivers, burrs, mounted grinding stones and other cutting or abrading tools may also be used. Since the tool may have shanks having various diameters or polygonal cross sections, the device is provided with a chuck that is adjustable over a relatively wide range. The chuck may be attached to the driver by a threaded or tapered bore.

A wide variety of chucks have been developed in the art. In one form, three jaws spaced circumferentially approximately 120° apart from each other are constrained in angularly disposed passageways in a body. The body is attached onto the drive shaft and is configured so that rotation of the body in one direction relative to a constrained nut engaging the jaws forces the jaws into gripping relationship with a cylindrical tool shank, while rotation in the opposite direction releases the gripping relationship. Such a chuck may be keyless if it is rotated by hand. One example of such a chuck is disclosed in U.S. Pat. No. 5,125,673 entitled "non-impact keyless chuck" which is commonly assigned to the present assignee and the entire disclosure of which is incorporated by reference herein.

Despite the success of keyless chucks such as set forth in U.S. Pat. No. 5,125,673, varying configurations of keyless chucks are desirable for a variety of applications. Existing bearing arrangements in chucks are designed to take a thrust load and to eliminate friction between the nut and the body in the axial direction. These bearings are sometimes caged and may have separate top and bottom thrust races. A chuck having an improved bearing configuration to minimize radial as well as axial stresses is disclosed in U.S. Pat. No. 5,348,318, the entire disclosure of which is incorporated by reference herein.

SUMMARY OF THE INVENTION

The present invention recognizes and addresses the foregoing considerations, and others, of prior art constructions and methods.

Accordingly, it is an object of the present invention to provide an improved chuck.

It is another object of the present invention to provide a keyless chuck that allows for efficient tightening of the nut on the jaws during operation.

Another object of the present invention is to provide a chuck that minimizes frictional contact between the chuck body and the nut.

A further object of the present invention is to provide a chuck which minimizes both axial and radial stresses during operation.

Yet another object of the present invention is to provide a chuck with an improved mechanism for maintaining the centrality of the nut during tightening.

These and other objects are achieved by providing a chuck for use with a manual or powered driver having a rotatable drive shaft. The chuck comprises a generally cylindrical body member having a nose section and a tail section. The tail section has an axial bore formed therein to mate with the drive shaft of the driver. The nose section has an axial bore formed therein. A plurality of jaws are disposed within the body longitudinally with respect to the nose section axial bore. Each of the jaws has a jaw face formed on one side thereof.

A self-contained anti-friction bearing assembly is in communication with the body. The bearing assembly has an inner race, an outer race, and bearing elements cooperating together. A nut is integrally attached to the bearing assembly and in operative communication with the jaws. A generally cylindrical sleeve member is in driving engagement with the nut whereby when the sleeve member is rotated with respect to the body member, the jaws will be moved radially with respect to the axial bore of the nose section.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1:
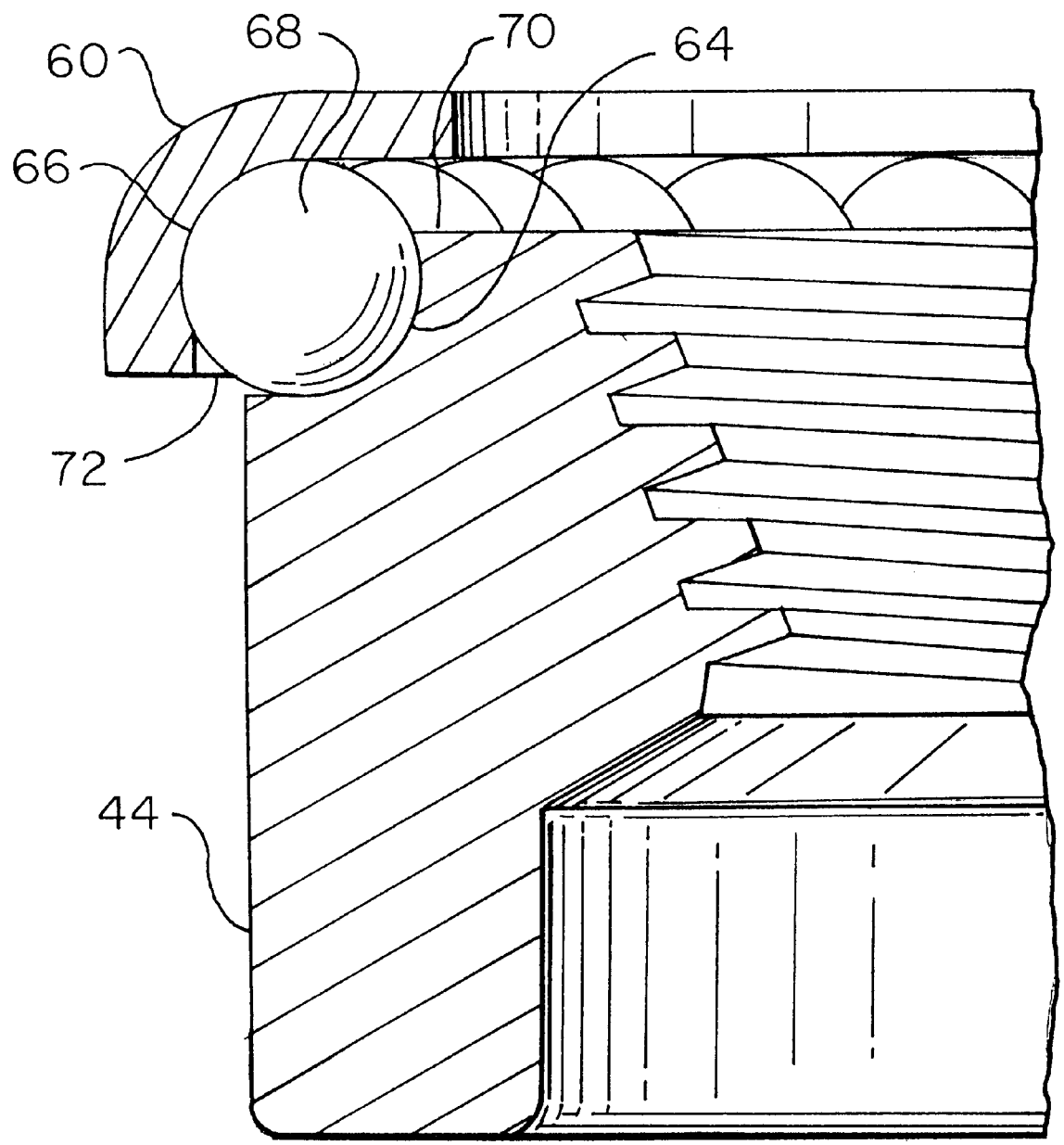
FIG. 1 is a detailed enlarged view of a bearing and nut arrangement in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. It will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
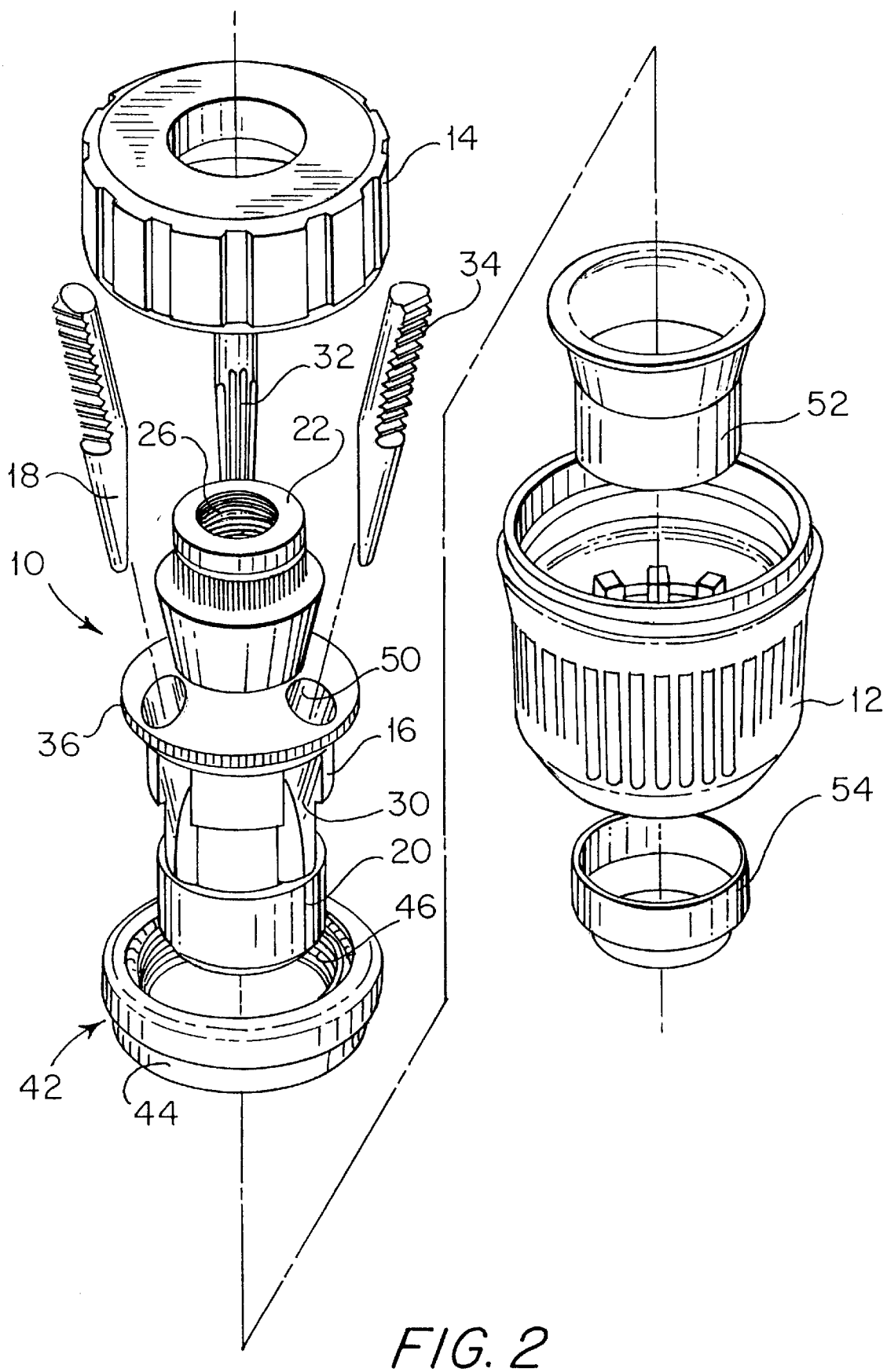
FIG. 2 is an exploded view of a chuck constructed in accordance with the present invention.

A chuck 10 is illustrated in FIG. 2. Chuck 10 includes front sleeve member 12, an optional rear sleeve member 14, a body member 16 and jaws 18. Body member 16 is generally cylindrical in shape and comprises a nose or forward section 20 and a tail or rearward section 22. An axial bore 24 (FIG. 3A) is formed in the nose section 20 and is somewhat larger than the largest tool shank that the chuck is designed to accommodate. A threaded bore 26 is formed in tail section 22 and is of a standard size to mate with the drive shaft of a powered or hand driver (not shown). The bores 24 and 26 may communicate at the central region 27 (FIG. 3A) of body member 16. While a threaded bore 26 is illustrated, such bore can be replaced with a tapered bore of a standard size to mate with a tapered driver shaft. Of course, other known connection mechanisms could be utilized between the body and the driver shaft.

Passageways 30 are formed in body member 16 to accommodate each jaw 18. Preferably, three jaws 18 are employed, and each jaw 18 is separated from the adjacent jaw by an arc of approximately 1200. The axes of the passageways 30 and the jaws 18 are angled with respect to the chuck axis but intersect the chuck axis at a common point ahead of the chuck body 16. Each jaw 18 has a tool engaging face 32 which is generally parallel to the axis of axial bore 24, which is the axis of chuck body 16. Each jaw 18 also defines threads 34 on its opposite or outer surface.

Body member 16 includes a thrust ring 36 which is preferably integral with the body. Thrust ring 36 includes an annular ledge 38 (FIG. 3A) to receive the outer race of a self-contained anti-friction bearing assembly 42. Thrust ring 36 includes plurality of jaw guideways 50 to permit retraction of the jaws 18.

Figure 3A:
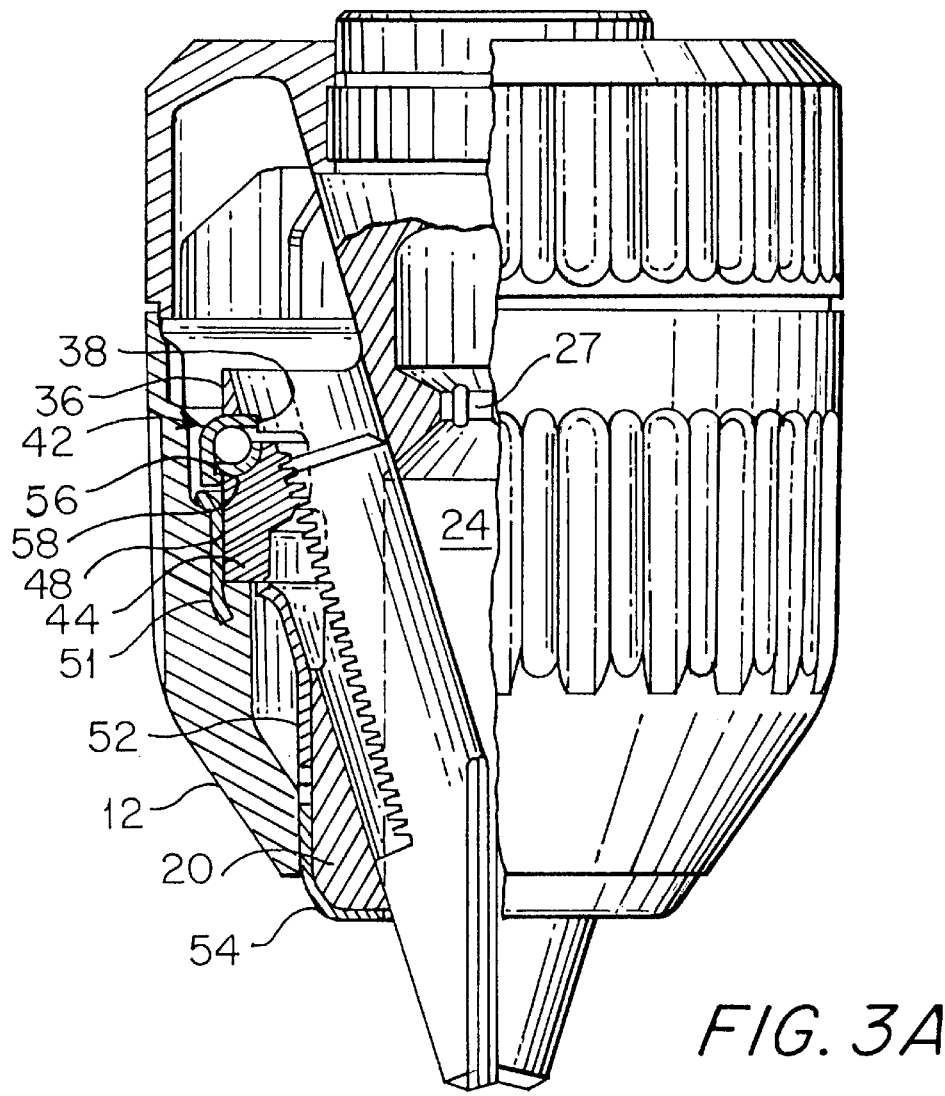
FIG. 3A is a longitudinal view, partly in section, of a chuck in accordance with an embodiment of the present invention.

A nut 44 includes threads 46 for mating with threads 34 on jaws 18 whereby when the nut is rotated with respect to the body, the jaws will advance or retract. Front sleeve 12 is adapted to be loosely fitted over nose section 20 of chuck 10. Sleeve 12 is press fit to nut 44 at 48 (FIG. 3A). As shown in FIG. 3A, sleeve 12 is a co-molded sleeve including a metal sleeve portion 51 that is pressed to nut 44. Sleeve portion 51 is optional, however, and sleeve 12 may be constructed entirely of a non-metal material, for example of various suitable polymers. In the embodiments illustrated in the figures, nut 44 is a one-piece nut axially retained by a cone 52 pressed to front portion 20 of body 16.

A nosepiece 54 is dimensioned and adapted to be pressed onto nose portion 20. It should be appreciated that nosepiece 54 is exposed when the chuck is assembled and is preferably coated with or constructed of a non-ferrous metallic coating to prevent rust and to enhance its appearance. The operation of such a nosepiece is disclosed in U.S. Pat. No. 5,348,317, the disclosure of which is fully incorporated by reference herein.

Figure 3B:
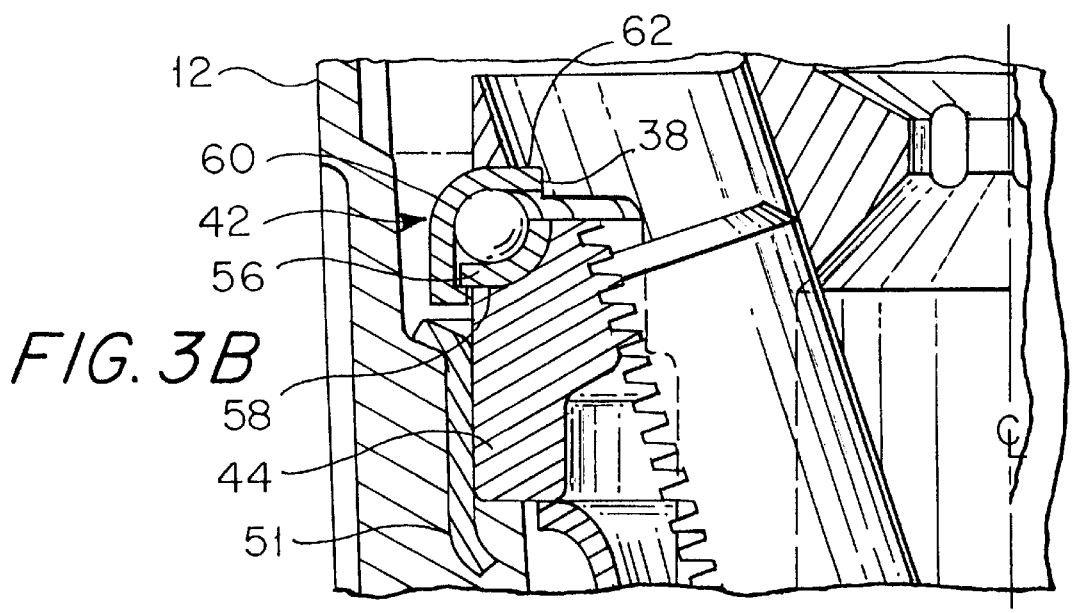
FIG. 3B is a partial cross-sectional view of the chuck as in FIG. 3A.

Referring now to FIGS. 3A and 3B, nut 44 is integrally attached to bearing assembly 42 by a press fit between nut 44 and inner race 56 of bearing assembly 42 at 58. Outer race 60 extends about inner race 56 to restrain axial movement of inner race with respect to the outer race. Accordingly, nut 44 and bearing assembly 42 may be mounted as a single unit during the construction of chuck 10. Furthermore, outer race 60 is seated on ledge 38 of bearing thrust ring 36, thereby centering the bearing assembly in the radial direction. Thus, thrust ring 36 receives radial forces at ledge side face 38 and axial forces at ledge rear face 62. Because nut 44 is integrally attached to bearing assembly 42, nut 44 is also maintained in a centered position, thereby improving chuck stability and operation.

Figure 4:
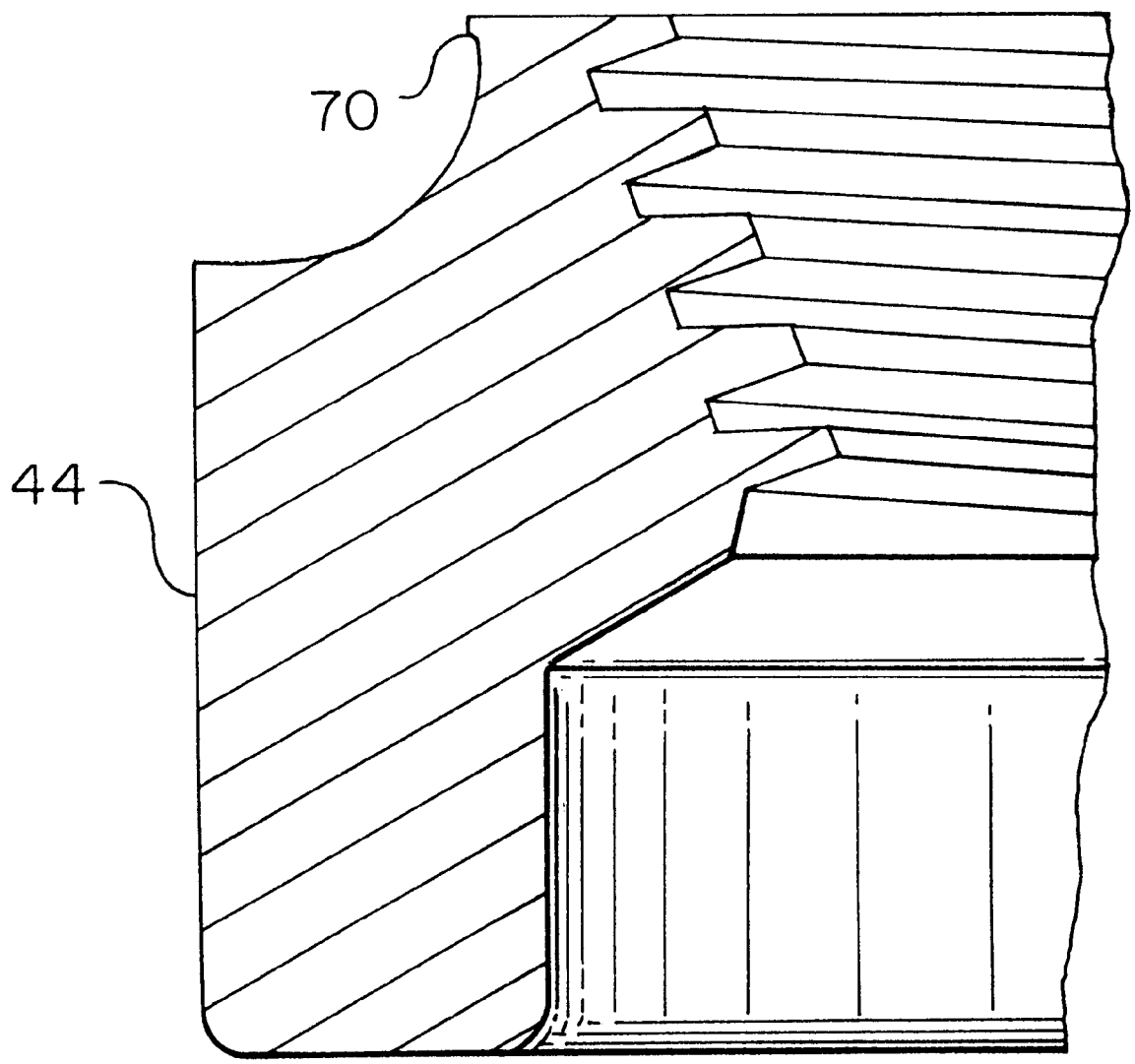
FIG. 4 is a detailed and enlarged view of the nut and inner race portion of a nut and bearing assembly constructed in accordance with an embodiment of the present invention.

As shown in FIGS. 3A and 3B, nut 44 and bearing assembly 42 are separate mechanisms integrally attached by a press fit. In another preferred embodiment illustrated in FIG. 1, however, the nut and the bearing assembly are integrally attached by construction as a unitary mechanism. Ball bearings 68 are seated between an inner groove 64 of nut 44 and an outer groove 66 of outer race 60. The opposing lips 70 and 72 of the radially aligned grooves 64 and 66, respectively, extend over opposing sides of the ball bearings so that the ball bearings maintain the nut and the outer race axially with respect to each other. The lips may have a more sharply designed construction, as illustrated at lip 70 in FIG. 4, as long as ball bearings 68 may effectively roll between the inner and outer races.

Those of ordinary skill in this art should understand that a variety of chuck constructions might implement the improved nut and bearing assembly and construction of the present invention. Thus, the chuck configuration illustrated in the figures is presented by way of example only and is not intended as a limitation on the present invention. For example, while the above description is set forth with respect to a keyless chuck, it should be appreciated that the principles of the present invention are equally applicable to a keyed chuck. Accordingly, while preferred embodiments of the invention have been described above, it is to be understood that any and all equivalent realizations of the present invention are included within the scope and spirit thereof. Thus, the embodiments depicted are presented by way of example only and are not intended as limitations upon the present invention, and those of ordinary skill in this art should understand that many modifications may be made. Therefore, it is contemplated that any and all such embodiments are included in the present invention as may fall within the literal or equivalent scope of the appended claims.

What is claimed is:

1. A chuck for use with a manual or powered driver having a rotatable drive shaft, said chuck comprising:

a generally cylindrical body member having a nose section and a tail section, said tail section being configured to mate with said drive shaft of said driver and said nose section having an axial bore formed therein;

a plurality of jaws disposed within said body longitudinally with respect to said axial bore, each of said jaws having a jaw face formed one side thereof;

a nut in operative communication with said jaws; and a self-contained anti-friction bearing assembly in communication with said body and having
a plurality of ball bearings,
a first race integrally attached to said nut and defining an annular groove receiving said ball bearings, and
a second race defining an annular groove receiving said ball bearings opposite said first race,
wherein said annular groove of at least one of said first race and said second race defines an arcuate surface that receives said ball bearings and defines a lip at an outer portion of said groove that extends radially inward from said arcuate surface and restrains said ball bearings from movement in an axial direction toward the other of said first race and said second race.

2. The chuck as in claim 1, including a generally cylindrical sleeve member in driving engagement with said nut whereby when said sleeve member is rotated with respect to said body member, said jaws will be moved with respect to said axial bore.

3. The chuck as in claim 1, wherein said first race defines a said lip.

4. The chuck as in claim 1, wherein each of said jaws has threads on a side thereof opposite said jaw face and wherein said nut threadedly engages said threads on said jaws so that rotation of said nut moves said jaws.

5. The chuck as in claim 1, wherein said nut and said first race are a unitary mechanism.

6. The chuck as in claim 1, wherein said nut and said bearing assembly are separate mechanisms.

7. The chuck as in claim 6, wherein said nut and said bearing assembly are attached by press fit.

8. The chuck as in claim 1, wherein said body includes a bearing thrust ring fixed thereto and wherein said bearing assembly axially abuts said bearing thrust ring.

9. The chuck as in claim 8, wherein said bearing thrust ring defines a circumferential annular ledge and wherein said bearing assembly is seated on said ledge to radially secure said bearing assembly with respect to said body.

10. The chuck as in claim 1, wherein each said groove simultaneously bears on said ball bearings on opposite sides, with respect to the axial direction of said chuck, of each said ball bearing so that said ball bearings axially secure said first race and said second race with respect to each other.

11. A chuck for use with a manual or powered driver having a rotatable drive shaft, said chuck comprising:

a generally cylindrical body member having a nose section and a tail section, said tail section being configured to mate with said drive shaft of said driver and said nose section having an axial bore formed therein and a plurality of angularly disposed passageways formed therethrough and intersecting said axial bore;

a plurality of jaws respectively disposed in each of said angularly disposed passageways, each of said jaws having a jaw face formed one side thereof and threads formed on the opposite side thereof;

a bearing thrust ring fixed on said body member and defining a circumferential annular ledge;

a nut in engagement with said threads on said jaws; and a self-contained anti-friction bearing assembly having a plurality of ball bearings, a first race integrally attached to said nut and defining an annular groove having an arcuate surface that receives said ball bearings, and a second race defining an annular groove receiving said ball bearings opposite said first race, said second race being seated on said ledge to radially secure said second race with respect to said body, wherein said annular groove of said first race defines a lip at an outer portion of said groove that extends radially inward from said arcuate surface and restrains said ball bearings from movement in an axial direction toward said second race, and wherein each said groove simultaneously bears on said ball bearings on opposite sides, with respect to the axial direction of said chuck, of each said ball bearing so that said ball bearings axially secure said first race and said second race with respect to each other.

12. The chuck as in claim 11, including a generally cylindrical sleeve member in driving engagement with said nut whereby when said sleeve member is rotated with respect to said body member, said jaws will be moved with respect to said axial bore.

13. The chuck as in claim 11, wherein said nut and said first race are a unitary mechanism.

14. The chuck as in claim 11, wherein said nut and said bearing assembly are separate mechanisms.

15. The chuck as in claim 14, wherein said nut and said bearing assembly are attached by press fit.

\* \* \* \* \*